March 12, 1929.  A. H. GREEN  1,705,184
TIRE CARRIER AND SUPPORTING MEANS THEREFOR
Filed April 22, 1925   3 Sheets-Sheet 1
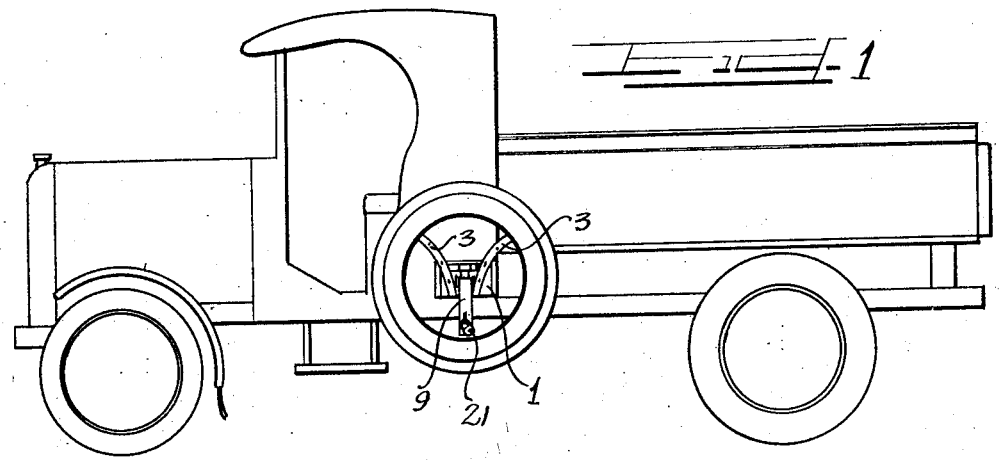
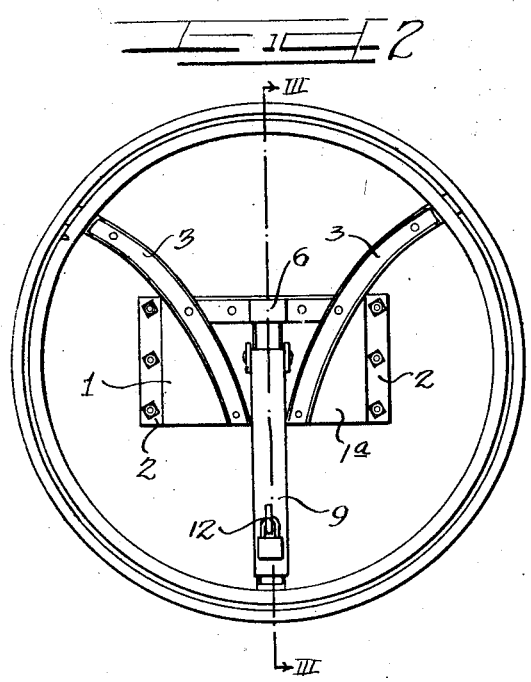
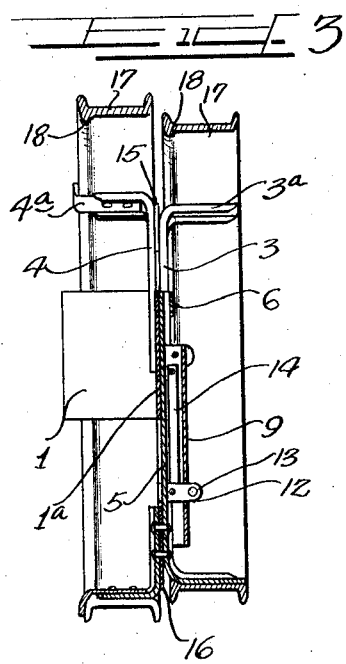
INVENTOR
Albert H. Green
by Charles Hill
Attys

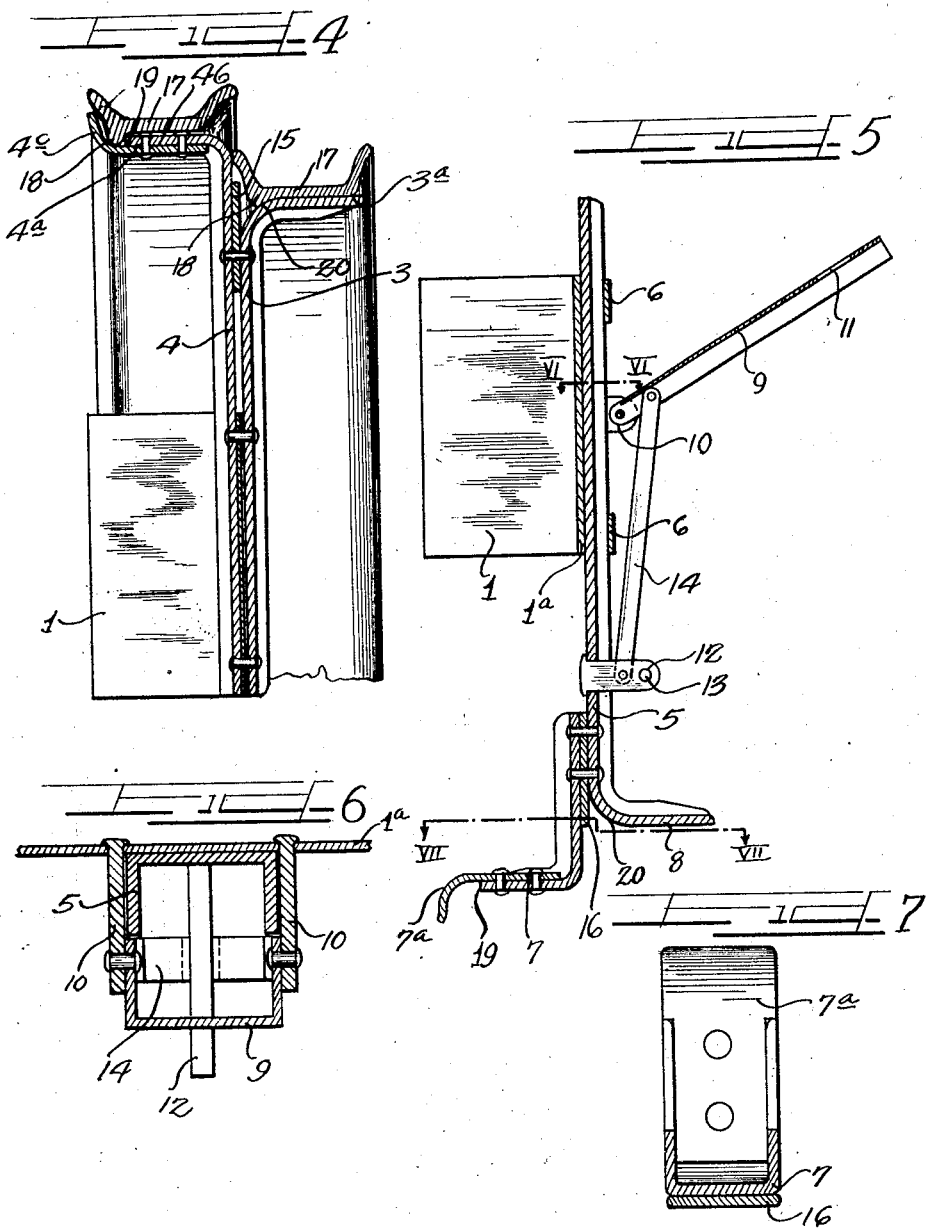

March 12, 1929.  A. H. GREEN  1,705,184
TIRE CARRIER AND SUPPORTING MEANS THEREFOR
Filed April 22, 1925   3 Sheets-Sheet 3
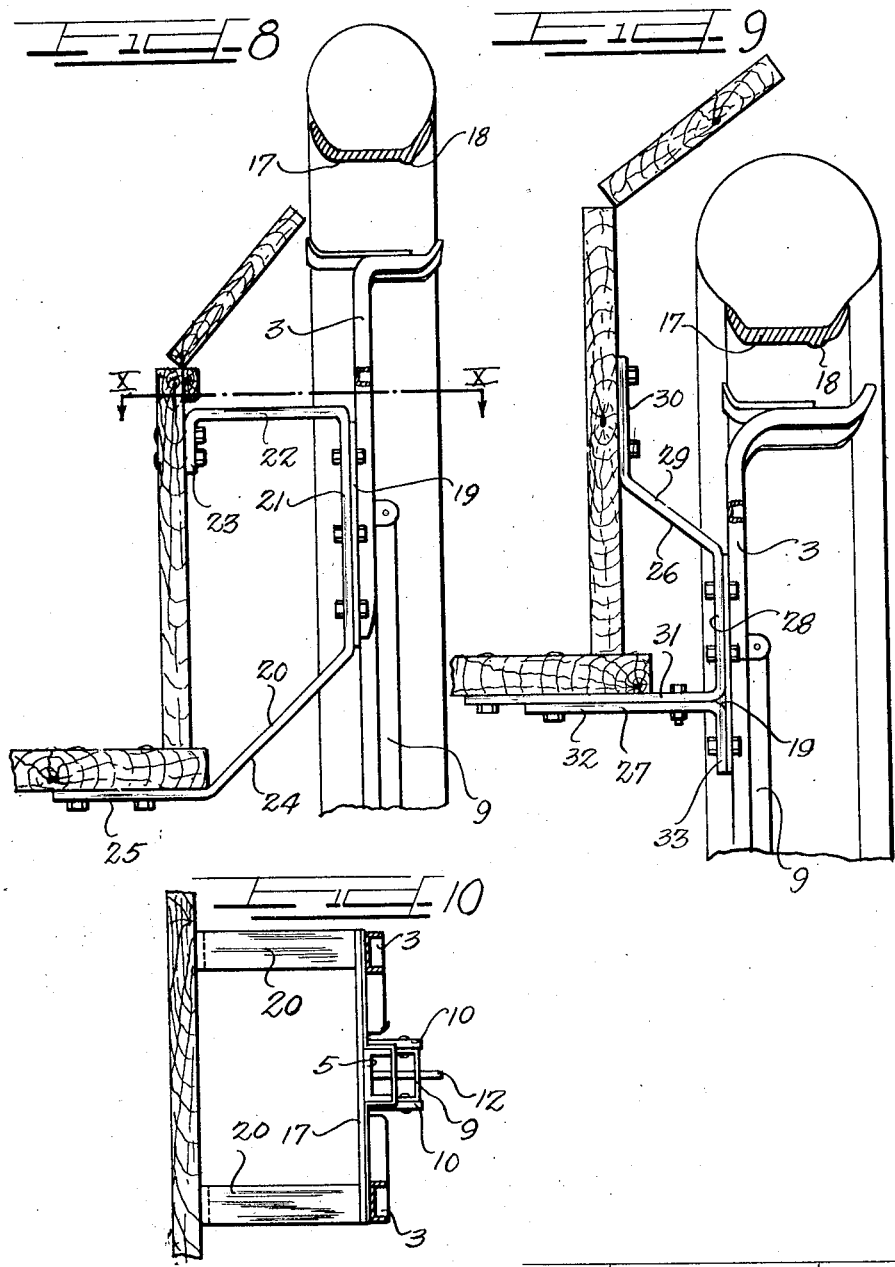
Inventor
Albert H. Green
By Charles Mills
Attys Patented Mar. 12, 1929.

1,705,184

UNITED STATES PATENT OFFICE.

ALBERT H. GREEN, OF CHICAGO, ILLINOIS, ASSIGNOR TO THE INTERNATIONAL STAMPING CO., OF CHICAGO, ILLINOIS, A CORPORATION OF ILLINOIS.

TIRE CARRIER AND SUPPORTING MEANS THEREFOR.

Application filed April 22, 1925. Serial No. 24,914.

This invention relates to a tire or rim carrier and concerns itself primarily with a structure comprising different sized units for supporting different sized rims, and a common adjustable part for simultaneously clamping or releasing both rims, together with a novel supporting means for attaching the carrier.

The invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of a truck equipped with a tire carrier involving this invention.

Figure 2 is an enlarged front elevational view of the carrier.

Figure 3 is an enlarged sectional view of the carrier taken substantially upon the line III—III of Figure 2.

Figure 4 is an enlarged fragmentary sectional view through a portion of the rim carrier.

Figure 5 is an enlarged fragmentary sectional view of the lower half of the carrier taken in substantially the same plane as Figure 3.

Figure 6 is a sectional view upon the line VI—VI of Figure 5.

Figure 7 is an enlarged sectional view upon the line VII—VII of Figure 5.

Figure 8 is an enlarged fragmentary sectional view through the carrier and the adjacent car body illustrating one form of attaching bracket.

Figure 9 is a view similar to Figure 8 illustrating a slightly different form of attaching bracket.

Figure 10 is a sectional view upon the line X—X of Figure 8.

As shown on the drawings:

Referring now to the drawings, there is illustrated a U-shaped support or bracket 1, the legs of which are provided with laterally extending attaching flanges 2 (Figure 2) whereby the same may be attached to a suitable part of the vehicle. In the present instance, it is shown as attached to one side of the vehicle.

The bridge portion $1^a$ of the U-shaped support has attached thereto a plurality of pairs of rim supporting members. Each pair consists of an arm 3 having a rim supporting shoe $3^a$ upon its outer end, and an arm 4 having a rim supporting shoe $4^a$ upon its outer end. The shoe $4^a$ comprises a flange $4^b$ upon the arm 4 and a separate shoe member $4^c$ attached to the under side of the flange $4^b$ and extending therebeyond and provided with an upwardly curved end. The shoes $3^a$ and $4^a$ are adapted to support different sized rims or tires side by side.

A slidable or movable rim supporting bracket 5 preferably of channel-shaped formation is slidably retained upon the support 1 by means of a pair of keepers 6. This bracket is preferably positioned in a pendant position between the brackets 3. The lower end of this bracket is provided with oppositely disposed rim supporting shoes 7 and 8, the former being attached to extend below the shoe 8 for supporting the larger sized rim.

The rim supporting shoe 7 comprises an angular member attached to the bracket 5 and a separate shoe member $7^a$ attached to the inner surface of the outstanding leg of the angular member. The outer end of shoe member $7^a$ is curved outwardly to retain the tire or rim thereon.

The tire rims 17 are usually provided with a bead 18 and when the rim is positioned upon the carrier, this bead is adapted to fit in the space between the separate shoe member $4^c$, and the end 19 of the flange $4^b$ and between the end of the shoe member $7^a$ and the end 19 of the flange to which it is attached. The ends 19 of these flanges form shoulders for coaction with the beads 18 for retaining the rims upon the shoes, or the shoe members $4^c$ and $7^a$ may be said to provide offset portions for receiving the beads 18 of the rim.

The shoes $3^a$ and 8 are provided with inner arcuate surfaces 20 which form shoulders against which the bead 18 of the rim may rest for retaining the same on the carrier.

Means are provided for shifting or moving the bracket 5. This means, in the present instance, consists of an actuator 9 in the form of a lever of channel formation pivoted upon a pair of ears 10 projecting from the bridge $1^a$ of the support. The lever is provided with a slot 11 adjacent its outer end for engaging over a stud 12 projecting from the bracket 5 and which may be construed as forming a part of such bracket. This stud is provided with an aperture 13 designed to receive the hasp of a padlock for locking the lever with respect to the bracket to prevent movement of the latter. The lever 9 is also connected with the bracket 5 for actuating the same. This connection consists of a link 14 connected at one end to the stud 12 and at the other end to an intermediate point of the lever 11.

Filler plates 15 are preferably placed between the arms 3 and 4 and similar filler plate 16 may be placed between the bracket 5 and shoe 7 to properly space the shoes.

In Figures 8 and 9 there are illustrated several forms of attaching brackets that are adapted to support the carrier from the side of any vehicle body. In other words, they are standard as to the different commercial bodies now upon the market. In referring to these figures, it will be noted that the rim supporting brackets are attached upon a plate 19 instead of on a U-shaped bracket as in Figure 2 and that the brackets generally consist of an intermediate portion attached to the carrier and laterally extending or offset portions attached respectively to the side and bottom of the vehicle body.

In the structure shown in Figure 8 a pair of brackets 20 are attached to the plate 19 and connected to the vehicle body. Each bracket consists of a vertical portion 21 that is bolted to the plate 19, an upper horizontal portion 22 provided with a depending flange 23 attached to the side of the vehicle body, a lower downwardly sloping portion 24 terminating in a horizontal flange or seat 25 secured to the bottom of the vehicle body. The attaching brackets shown in Figure 8 support the carrier in such a position that the rims project above the vehicle body.

In the structure shown in Figure 9, the carrier supporting brackets are designed to sustain the carrier in such a position that the supported rims will be below the top of the vehicle body. One of the brackets in Figure 9 is shown, only, and in referring to said figure it will be observed that said bracket consists of two angular members 26 and 27 which are bolted together, such a bracket, however, may be cast as an integral structure. The member 26 has a vertical portion 28 bolted or secured to the plate 19, an upwardly sloping upper arm 29 which terminates in a vertical attaching flange 30 bolted or secured in any suitable way to the side of the body, and a horizontal branch 31 bolted to the bottom of the vehicle body. The member 27 consists of a horizontal portion 32 bolted to the bottom of the vehicle body and to the branch 31 of the member 26, and a depending flange 33 bolted or secured to the plate 19.

It will be appreciated that these brackets will fit any of the standard commercial vehicle bodies and that they will rigidly support the carriers, and that they may be readily and quickly attached without the alteration of parts.

In the use of the carrier, the actuator 9 is raised into the position shown in Figure 5 for elevating the bracket 5 for removing and replacing a rim upon the carrier. To lock the rims upon the carrier the actuator 9 is swung down into the position shown in Figure 2 thereby shifting the movable bracket downwardly against the rims. The actuator may then be engaged over the stud 12 and locked thereto by a padlock 21 as shown in Figure 1, whereby the bracket 5 becomes locked against movement.

It will be understood that while I have shown my carrier adapted for supporting tire rims, it is susceptible of supporting tires per se or tires mounted upon a rim.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a device of the class described, a support, two pairs of supporting members rising from said support, each pair comprising oppositely disposed members, a supporting bracket having oppositely disposed shoes slidably retained upon said support, a stud projecting from said bracket, a lever pivoted upon said support, a link connecting said lever and stud, and means for locking said lever to said stud.

2. In a carrier of the class described, a support, a pair of supporting members rising from said support, a supporting bracket slidably retained on said support, a stud projecting from said bracket, a lever pivoted on said support, a link connecting said stud and lever, said lever being adapted to engage over said stud and be locked thereto.

3. In a tire rim carrier, a support, a plurality of rim supporting members rising from said support, a supporting bracket slidably mounted upon said support, a lever pivoted upon said support, a connection between said lever and bracket whereby operation of said lever actuates said bracket, and means for locking said lever to said bracket when the latter is in a predetermined position.

4. In a carrier of the class described, a support, supporting members extending from said support, a slidably supporting bracket, a lever pivoted on said support and connected to said bracket for actuating the same, and means for locking said lever in fixed position.

5. A tire carrier supporting bracket comprising a member having an intermediate portion for attachment to the carrier, an upper offset terminal portion adapted for attachment to the side of a vehicle body, and a lower terminal portion adapted for attachment to the bottom of the vehicle body.

6. A supporting bracket for a tire or rim carrier having vertical attaching means secured to the carrier and laterally extending portions, one portion for attachment to the side of a vehicle body and the other for attachment to the bottom of the vehicle body.

7. In a tire carrier, a supporting plate, a pair of brackets having vertical portions attached to said plate, each bracket having laterally extending portions, one portion providing a vertical attaching means and the other a horizontal attaching means.

8. In a tire or rim carrier, a supporting plate, a pair of brackets secured to said plate, each bracket having a portion attached to said plate, and an upper offset portion provided with an attaching flange adapted for securement to the side of a vehicle body, and a lower laterally extending portion adapted for attachment to the bottom of the vehicle body.

9. In a carrier of the class described, a support, two pairs of tire supporting members attached to said support, each pair of members comprising tire supporting shoes at different elevations from said support, a tire supporting bracket slidably mounted upon said support, said bracket comprising tire supporting shoes having different elevations for supporting different sized tires, a stud projecting from said bracket, a lever pivoted upon said support, a link connecting said lever and stud, and means for locking said lever to said stud.

10. In a carrier of the class described, a stationary support, tire rim supporting means rising from said support, said means comprising opposed rim supporting shoes for carrying different sized tires, a bracket slidably mounted on said support, said bracket having opposed rim engaging shoes for supporting rims of different sizes, a lever pivotally connected to said support and having an intermediate connection with said bracket for actuating the same, and means for locking said lever to said bracket.

11. In a carrier of the class described, a mounting, supporting members extending from said mounting, a slidably supported element, a lever element pivotally connected to said mounting for actuating said slidable element, and interlocking means comprising a projection associated with one of said elements adapted to be embraced by the other element.

12. In a carrier of the class described, a plurality of supporting members, a mounting therefor, a supporting element associated with said mounting slidably retained relative to said members, a lever pivotally connected to said mounting, a connection between said lever and supporting element for enabling the movement of said lever to actuate said supporting element and interlocking means between said lever and supporting element including a projection connected to said supporting element and cooperable with said lever.

In testimony whereof I have hereunto subscribed my name.

ALBERT H. GREEN.